United States Patent [19]

Opsahl et al.

[11] Patent Number: 4,851,463
[45] Date of Patent: Jul. 25, 1989

[54] ETHYLENE COPOLYMER COMPOSITIONS HAVING IMPROVED FIRE RETARDANCY

[75] Inventors: Arthur W. Opsahl, Chadds Ford, Pa.; Lewis D. Watson, Newark, Del.

[73] Assignee: E. I. Du Pont De Nemours and Company, Wilmington, Del.

[21] Appl. No.: 157,616

[22] Filed: Feb. 19, 1988

[51] Int. Cl.[4] .................... C08K 00/00; B32B 00/00; C08L 00/00
[52] U.S. Cl. .................................. 524/109; 524/145; 524/167; 524/322; 524/437; 524/522
[58] Field of Search ............... 524/114, 109, 115, 145, 524/322, 437, 456, 474, 522, 167, 321, 314

[56] References Cited

U.S. PATENT DOCUMENTS 4,430,468 2/1984 Schumacher ..................... 524/109
4,434,258 2/1984 Schumacher et al. ............. 524/13

Primary Examiner—Herbert J. Lilling
Attorney, Agent, or Firm—Paul R. Steyermark

[57] ABSTRACT

A composition having improved fire retardancy consisting essentially of an ethylene copolymer with at least one other comonomer, an ethylene copolymer with an unsaturated carboxylic acid, an alpha-olefin polymer, a plasticizer, alumina hydrate and/or magnesium hydroxide, glass fiber, a surfactant, and an organic acid, is suitable for making building panels and other construction elements, roofing sheets, wire coatings, pipe wraps, etc.

27 Claims, No Drawings

ETHYLENE COPOLYMER COMPOSITIONS HAVING IMPROVED FIRE RETARDANCY

BACKGROUND OF THE INVENTION

This invention relates to compositions having improved fire retardancy, containing ethylene copolymers.

Polymer compositions containing one or more ethylene polymers, fillers, and optionally other components such as compatibilizers, surfactants, etc. are known. A class of highly filled ethylene copolymer compositions containing processing oils or other compatibilizing agents are available commercially from E. I. du Pont de Nemours and Company, Wilmington, Del. under the name Keldax®. Several U.S. Pat. Nos. describe such compositions, including U.S. 4,191,798 (Schumacher et al.); 4,222,924 (Schumacher); 4,263,196 (Schumacher et al.); 4,403,007 (Coughlin); 4,438,228 (Schenck); 4,379,190 (Schenck); 4,434,258 (Schumacher); 4,480,061 (Coughlin et al.); 4,472,545 (Coughlin et al.); 4,434,261 (Brugel et al.); and 4,430,468 (Schumacher). Most of those compositions, because of their high level of filler material, usually inorganic filler material, have a certain degree of fire resistance but are mainly used in applications where fire resistance or fire retardancy are not critical requirements. They often are used, for example, as sound deadening automotive carpets or liners.

It would be desirable to have available a highly filled ethylene copolymer composition for uses in which flame retardancy is a critical requirement, for example, in building panels, roofing sheets, electrical wire coverings, etc. However, because of very stringent test requirements, the currently available ethylene copolymer compositions cannot be recommended for such uses. A satisfactory composition must not only possess acceptable mechanical properties at its normal operating temperature but also at high temperatures occurring at the time of fire, so that it will not sag, flow, and eventually ignite. The goal is to obtain on exposure to flame a char structure having good heat insulating properties and mechanical integrity capable of preventing further spread of fire.

SUMMARY OF THE INVENTION

According to the present invention, there is now provided a composition having improved fire retardancy, said composition consisting essentially of the following components present in the approximate indicated weight proportions:

(a) 5–20% of at least one copolymer of ethylene with at least one comonomer selected from the group consisting of vinyl esters of saturated $C_1$–$C_4$ carboxylic acids and $C_1$–$C_6$ alkyl esters of alpha,beta-unsaturated $C_3$–$C_5$ monocarboxylic or dicarboxylic acids, the ethylene content of said copolymer being about 60–90%, and the comonomer content being about 40–10%, and the melt index of said copolymer being about 0.1–150 dg/min according to ASTM Standard D1238, Procedure A, Condition E; provided that when the comonomer is a vinyl ester, said copolymer can also contain up to about 15% of carbon monoxide;

(b) 1–7% of a copolymer of ethylene with an alpha,beta-unsaturated carboxylic acid and optionally a third monoethylenically unsaturated comonomer, the approximate respective monomers proportions in said copolymer being 50–99%, 1–25%, and 0–30%; which copolymer can be neutralized to the extent of 0–95% with a metal ion;

(c) 2–10% of a $C_2$–$C_6$ alpha-olefin polymer;

(d) 2–15% of a plasticizer selected from the group consisting of processing oils, epoxidized oils, polyesters, polyethers, polyether esters, and combinations thereof;

(e) 60–80% of a filler selected from the group consisting of alumina trihydrate, magnesium hydroxide, and a mixture of alumina trihydrate with up to 20% of magnesium hydroxide, based on the total filler (e);

(f) 0.3–1% of glass fiber;

(g) 0.01–2% of a surfactant; and (h) 0.01–2% of an organic acid or acid derivative selected from the group consisting of saturated $C_6$–$C_{54}$ carboxylic acids, unsaturated $C_{12}$–$C_{20}$ carboxylic acids, alicyclic and aromatic carboxylic acids, and metal salts, esters, and amides of said organic acids.

As used herein, the expression "consisting essentially of " means that in addition to the named ingredients, small amounts of other components which do not prevent the advantages of the present invention from being realized can also be present.

DETAILED DESCRIPTION OF THE INVENTION

The ethylene copolymer (a) may contain as the other comonomer any suitable vinyl ester, such as, for example, vinyl acetate, vinyl propionate, vinyl butyrate, and vinyl succinate; an alkyl ester of an unsaturated carboxylic acid such as, for example, methyl acrylate, butyl acrylate, methyl methacrylate, ethyl acrylate, monomethyl maleate, and dimethyl maleate. Particular copolymers of this class include, for example, ethylene/vinyl acetate, ethylene/methyl methacrylate, ethylene/ethyl acrylate, ethylene/vinyl acetate/carbon monoxide, and ethylene/isobutyl acrylate copolymers. Preferred are ethylene/vinyl acetate and ethylene/ethyl acrylate copolymers. The preferred amount of this component (a) in the compositions of the present invention is about 7–15% of the total composition.

Suitable carboxylic copolymers (b) may contain as the carboxylic comonomer any suitable carboxylic acid such as, for example, acrylic and methacrylic acids as well as monoesters of unsaturated dicarboxylic acids such as, for example, monomethyl maleate and monoethyl ithaconate, which still have one free carboxylic group. The preferred carboxylic copolymer is ethylene/methacrylic acid copolymer.

The carboxylic groups may be unneutralized or neutralized with a metal ion, such as, for example, sodium, potassium, magnesium, zinc, or aluminum. Generally, complete neutralization is not possible, but partially neutralized carboxylic copolymers of ethylene are known as ionomers. They are described, i.a., in U.S. Pat. No. 3,264,272 (Rees). Many ionomers are commercially available from E. I. du Pont de Nemours and Company, Wilmington, Del., under the trademark Surlyn®. The preferred amount of this component is about 1–5% of the total composition.

The alpha-olefin polymer (c) can be a homopolymer of a $C_2$–$C_6$ alpha-olefin, such as, e.g. polyethylene, polypropylene, polybutene, polyisobutylene, etc., or a copolymer of a $C_2$–$C_6$ alpha-olefin with another alpha-olefin, for example, an ethylene/propylene, an ethylene/butene-1, or an ethylene/octene-1 copolymer but preferably will be polyethylene. This may be a so-called high density (0.94 g/cm$^3$ or higher) or a so-called low density polyethylene, and can be a linear or branched polymer. All of those polyethylenes are well known to those skilled in the art.

The preferred amount of the alpha-olefin polymer (c) is about 3–9% of the total composition.

The plasticizer (d) can be a processing oil, an epoxidized oil, a polyester, a polyether, a polyether ester, or a combination thereof. Suitable processing oils preferably are naphthenic or aromatic, but can also be olefinic. However, paraffinic oils have a tendency to bleed from the compositions of the present invention. The preferred oils have a Sayboldt Universal Seconds (SUS) rating of 100–6000 at 38° C. Suitable epoxidized oils include epoxidized soybean oil and epoxidized linseed oil.

Suitable polyesters are liquid condensation products of a polybasic acid and a polyol. The term "liquids" means that the material is pourable at room temperature. The acid can be, for example, adipic acid, azelaic acid, phthalic acid, sebacic acid, and glutaric acid, or mixtures thereof. The polyol can be, for example ethylene glycol, propylene glycol, 1,4-and 1,3-butanediol, diethylene glycol, and polyethylene glycol.

Polyethers and polyether esters are oligomers or polymers of alkylene oxides. Polyethers are terminated by hydroxyl groups, but those can be further reacted with an acid to form ester groups. Typical such acids are stearic and lauric acids. The resulting materials are polyether esters. Detailed information about plasticizers of the above types, that also are suitable in the compositions of this invention, is given in U.S. Pat. No. 4,430,468, which is hereby incorporated by reference.

The preferred plasticizer is processing oil. The preferred amount of plasticizer in the compositions of the present invention is about 2–10%.

Component (e) of the compositions of the present invention can be alumina trihydrate or magnesium hydroxide, the former being preferred, or a mixture of both containing no more than the stated amount of the latter. Alumina trihydrate (ATH) or aluminum oxide trihydrate, is a known commercial product available from several commercial sources. It has the formula $Al_2O_3 \cdot 3H_2O$ and it has the property of releasing its crystallization water at about 200°–360° C. Because of this, ATH is frequently used in polymer compositions designed to have some flame resistance or flame retardancy. ATH is available in various particle sizes, from very fine to very coarse. It has been found that suitable average ATH particle sizes are about 4–10 micrometers, but the best results were obtained with a mixture of about equal weights of ATH of 3–4 micrometers and 70–100 micrometers average particle sizes. With such a mixture, a desirable compromise is reached among the important properties such as surface area, rate of release of hydration water, and viscosity. Small particles tend to increase viscosity, while large particles tend to reduce the rate of hydration water release. The preferred amount of ATH is about 70–80%, especially 72–78% of the composition.

Magnesium hydroxide, $Mg(OH)_2$, occurs naturally as brucite and is readily available commercially. Magnesium hydroxide loses its hydration water on heating to about 350° C. and therefore also is suitable for use in flame retardant compositions. The same general comments can be made with respect to the particle sizes of magnesium hydroxide. Magnesium hydroxide, when used by itself, does not release as much water at high temperatures as does alumina hydrate but provides better quality char structures.

Glass fiber is a well known commercial product available from several sources. The optimum diameter of the glass fiber is about 10–20 micrometers and the aspect ratio about 10–20. While the starting glass fiber is generally quite long, and the aspect ratio is quite high, this material normally breaks into smaller fibers during the processing. It is estimated that the actual average length of the glass fiber present in the compositions of the present invention is about 6 mm. The preferred amount of glass fibers is about 0.5–1% of the composition.

The surfactant (g) is a material which helps disperse glass fiber in carboxylic copolymer (b) as well as the filler in the overall composition. Suitable surfactants include, for example, alkanolamides, betaine derivatives, block copolymers comprising condensates of ethylene oxide with hydrophobic oligomers obtained by condensing propylene oxide with propylene glycol; ethoxylated compounds comprising alcohols, alkylphenols, amines, and amides; sulfonated derivatives comprising alkyl sulfonates, aryl sulfonates, alkyl aryl sulfonates, amine and amide sulfonates, olein sulfonates, sulfosuccinates, sulfonated fatty acid esters, sulfonates of ethoxylated alkylphenols and of oils of fatty acids, naphthalene and alkylnaphthalene sulfonates, condensed naphthalene sulfonates, petroleum sulfonates, dodecyl and tridecylbenzene sulfonates, dodecyl and tridecylsulfonic acids, sulfates of alcohols, of ethoxylated alcohols, of ethoxylated alkylphenols, of oils, of fatty acids, of fatty esters, and sodium, ammonium, and amine salts of alcohol sulfates; phosphate derivatives comprising phosphate esters, phosphate alcohol ethoxylates and phosphate alkyl quaternary compounds; quaternary surfactants; and liquid polyesters. All those surfactants, or wetting agents, are discussed in detail in U.S. Pat. No. 4,430,468.

The organic acid (h) usually is a long chain aliphatic acid such as, e.g., stearic or palmitic acid. Other saturated acids include, e.g., azelaic acid and 1,10-decanedicarboxylic acid. Other suitable acids include unsaturated long chain acids such as, e.g., oleic acid, alicyclic acids such as, e.g. cyclohehanecarboxylic acid or furanoic acid, and aromatic acids such as, e.g., benzoic and naphthoic acids. The organic acid or acid derivative is added to improve tensile elongation. Metal salts include, e.g. sodium, potassium, calcium, zinc, magnesium, and aluminum salts of such acids. Esters usually are esters of lower alcohols such as methyl, ethyl, propyl, and butyl alcohols, ethylene glycol, and glycerol. Finally, amides can be derived from ammonia or from any suitable primary or secondary amines.

The compositions of the present invention preferably are prepared by blending the ethylene copolymer (a) with a masterbatch consisting of a blend of ethylene copolymer (b) with alpha-olefin polymer (c), with glass fiber (f), and with surfactant (g) The purpose of the surfactant is to better disperse the glass fiber in the polymers of the masterbatch. Its presence also helps disperse the ATH or magnesium hydroxide filler, which is then added and further blended with that composition until a uniform dispersion has been obtained. Blending normally this carried out at a temperature above the melting temperature of the highest melting polymer, in suitable equipment such as, for example, a Banbury ® mixer, a Farrell ® mixer, or a rubber mill.

The compositions of the present invention are suitable in uses where fire retardancy and good mechanical properties are important, for example, in building panels and other construction elements, roofing sheets, wire coatings, fire stops, fire doors, and pipe wraps.

This invention is now illustrated by the following examples of certain preferred embodiments thereof, where all parts, proportions and percentages other than the degree of neutralization are by weight.

The burn/sag test, used in some experiments, was performed as follows:

The test composition was compression molded into a 150 mm × 150 mm × 3.6 mm plaque, which was placed on a three-prong laboratory ring stand having an opening of 89 mm. A Bunsen burner operating on natural gas was placed under the sample in the center of the plaque, and the height of the flame was adjusted so that the flame was just touching the sample at the beginning of the test. The flame was left in contact with the sample for 5 minutes. The sample was then inspected visually for sag, drip and burn through. The char also was inspected visually to determine whether it remained intact or lost its mechanical integrity.

EXAMPLE 1

A masterbatch of acid copolymer, polyethylene, glass, surfactant, and antioxidant was first made by extrusion blending. Blends of this type and blending conditions are described in U.S. Pat. No. 4,477,617. All the components are available commercially. In this example, the ingredients were 30% of an ethylene/methacrylic acid (E/MAA) copolymer containing 10% MAA, the acid groups being neutralized 71% with zinc ions, having a melt index (MI) of 1.5 dg/min, 61.5% of a high density polyethylene of MI 2.8 dg/min and density of 0.96 g/cm$^3$, 7.5% of glass fibers (PPG-3541), 0.3% of a surfactant, Tergitol ® XD (Union Carbide), and an antioxidant, Irganox ® 1010 (Ciba-Geigy).

This material (referred to here as masterbatch A) was mixed as described below with the other ingredients in the following amounts: 10% masterbatch A, 1% of an ethylene/vinyl acetate (E/VA) copolymer (VA content 32–34%, MI 38–48 dg/min), 10.5% of an E/VA copolymer (VA content 17–19%, MI 0.6–0.8 dg/min), 3% Sunthene ® 4240 (Sun Oil Co.) process oil, 37.5% of ATH (Polyfill ® 402, Custom Grinder Sales, Inc., Chaddsworth, GA), 37.5% ATH (Reynolds, R-H 30), and 0.5% stearic acid. The final levels of the various components, as defined in the Summary of the Invention were thus:

11.5% of (a)
3.0% of (b)
6.15% of (c)
3.0% of (d)
75% of (e)
0.75% of (f)
0.03% of (g)
0.5% of (h) and
0.07% of antioxidant.

The ingredients, as described in the above paragraph were first mixed in a ribbon blender, then fed into a Farrel ® continuous mixer. Conditions were similar to those described by the manufacturer. Melt temperature was about 160° C. The blend was then conveyed to a mill with a take off temperature of 115° C., and a back roll temperature of 137° C. The banded material was cut into strips, quenched in a water bath, blown dry, and pelletized.

Tensile strength of the material was 8960 kPa. In the sag/burn test, there was almost no sag, no drip, and no burn through, and the char was cohesive.

The following are comparative examples.

EXAMPLE C1

A mix of the following materials was made using a Farrel ® continuous mixer as described above. 17.3% low density polyethylene (LDPE) of MI 2 dg/min and density of 0.918 g/cm$^3$, 75.8% ATH (R-H 30), 6.4% Sunthene ® 4240, and 0.5% stearic acid. No glass fiber, surfactant or copolymer (a) or (b) were present, and the alpha-olefin polymer (c) was in excess of the indicated limits.

In the sag/burn test, the material sagged badly. The material thus maintained no rigidity under burning conditions, even though the filler level was slightly higher than in Example 1, and would be unsuitable for many of the end uses envisioned for it.

EXAMPLE C2

A similar mix was made as in example C1, except that 1.3% of the LDPE was replaced with 1.3% of an ethylene/vinyl acetate copolymer (MI 38–48 dg/min, VA content 32–34%). Again the material performed very badly in the sag/burn test, showing a high degree of sag.

EXAMPLE C3

A mix was made as in example C1, of the following ingredients: 2.2% ethylene/vinyl acetate copolymer (MI 38–48 dg/min, VA content 32–34%), 15.6% ethylene/vinyl acetate (MI 0.6–0.8 dg/min, VA content 17–19%)., 6.4% Sunthene ® 4240 process oil, and 75.8% ATH (Reynolds R-H 30). Once again, the material sagged very badly.

EXAMPLE C4

The following mix was made in a Banbury type batch mixer: 5% of an ethylene/methacrylic acid copolymer (15% MAA, 59% Na neutralized, MI 0.9 dg/min), 1% ethylene/vinyl acetate (MI 38–48 dg/min, VA content 32–34%), 12.5% ethylene/vinyl acetate (MI 0.6–0.8 dg/min, VA content 17–19%), 80% ATH (56% Polyfill ® 402, 24% R-H 30), 1% Sunthene ® 4240, and 0.5% stearic acid. In this composition, no alpha-olefin polymer and no glass or surfactant was present; the level of plasticizer was only 1%; and the ATH level was 80%. This mix produced a crumbly, non-cohesive mass in the mixer. This illustrates that high levels of filler with insufficient plasticizer produce inadequate material.

EXAMPLE C5

The following mix was made in a Banbury type batch mixer: 2.2% ethylene/vinyl acetate (MI 38–48 dg/min, VA content 32–34%), 12.6% ethylene/vinyl acetate (MI 0.6–0.8 dg/min, VA content 17–19%), 6.4% Sunthene ® 4240, 75.8% ATH (R-H 30), 2.5% glass fiber (PPG-3541), and 0.5% stearic acid. In this composition, the glass fiber level was 2.5%, well above the permitted limit.

The material was very stiff, but again could not be made into cohesive non-friable parts despite a higher level of plasticizer than in Example 1.

EXAMPLE C6

In this example, a higher level of high density polyethylene (HDPE) than permitted for the alpha-olefin (c) was present, while glass fiber, surfactant, and acid copolymer were absent. The blend was made in a Farrel® continuous mixer, as follows: 16% HDPE (MI 0.45 dg/min, density 0.95 g/cm$^3$), 1.3% ethylene/vinyl acetate copolymer (MI 38–48 dg/min, VA content, 32–34%), 5% Sunthene® 4240, 1.4% Santicizer® 409 (Monsanto), also a plasticizer, 75.8% ATH (R-H 30), and 0.5% stearic acid.

The tensile strength of this material was unacceptably low, at 2760 kPa.

We claim:

1. A composition having improved fire retardancy, said composition consisting essentially of the following components present in the approximate indicated weight proportions:
   (a) 5–20% of at least one copolymers of ethylene with at least one comonomer selected from the group consisting of vinyl esters of saturated $C_1$–$C_4$ carboxylic acids and $C_1$–$C_6$ alkyl esters of alpha, beta-unsaturated $C_3$–$C_5$ monocarboxylic or dicarboxylic acids, the ethylene content of said copolymer being about 60–90%, and the comonomer content being about 40–10%, and the melt index of said copolymer being about 0.1–150 dg/min provided that when the comonomer is a vinyl ester, said copolymer can also contain up to about 15% of carbon monoxide;
   (b) 1–7% of a copolymer of ethylene with an alpha,-beta-unsaturated carboxylic acid and optionally a third monoethylenically unsaturated comonomer, the approximate respective monomer proportions in said copolymer being 50–99%, 1–25%, and 0–30%; which copolymer can be neutralized to the extent of 0–95% with a metal ion;
   (c) 2–10% of a $C_2$–$C_6$ alpha-olefin polymer;
   (d) 2–15% of a plasticizer selected from the consisting of processing oils, epoxidized oils, polyesters, polyethers, polyether esters, and combinations thereof;
   (e) 60–80% of a filler selected from the group consisting of alumina trihydrate, magnesium hydroxide, and mixtures of alumina trihydrate with up to 20% of magnesium hydroxide, based on the total amount of filler (e);
   (f) 0.3–1% of glass fiber;
   (g) 0.01–2% of a surfactant; and
   (h) 0.01–2% of an organic acid or acid derivative selected from the group consisting of saturated $C_6$–$C_{54}$ carboxylic acids, unsaturated $C_{12}$–$C_{20}$ carboxylic acids, alicyclic and aromatic carboxylic acids, and metal salts, esters, and amides of said organic acids.

2. A composition of claim 1 wherein the ethylene copolymer (a) is ethylene/vinyl acetate copolymer or ethylene/ethyl acrylate copolymer.

3. A composition of claim 1 wherein the carboxylic copolymer (b) is ethylene/methacrylic acid copolymer.

4. A composition of claim 1 wherein the alpha-olefin polymer (c) is polyethylene.

5. A composition of claim 1 wherein the carboxylic copolymer (b) is partially neutralized with a metal ion.

6. A composition of claim 1 wherein the plasticizer is a processing oil.

7. A composition of claim 1 wherein component (e) is alumina trihydrate, and its average particle size is about 4–10 micrometers.

8. A composition of claim 1 wherein component (e) is alumina trihydrate, which is a mixture of about equal weights of alumina trihydrate having an average particle size of about 3–4 micrometers with alumina trihydrate having an average particle size of about 70–100 micrometers.

9. A composition of claim 1 wherein carboxylic copolymer (b) is present in an amount of about 1–5% by weight of the total composition.

10. A composition of claim 1 wherein the organic acid or organic acid derivative (h) is stearic acid.

11. A composition of claim 1 wherein filler (e) is alumina trihydrate; the amount of alumina trihydrate is about 70–80% and the amount of glass fiber is about 0.5–1% by weight.

12. A composition of claim 11 wherein the amount of alumina trihydrate is about 72–78% by weight.

13. A composition of claim 12 wherein the amount of ethylene copolymer (a) is about 7–15% by weight.

14. A composition of claim 1 wherein filler (e) is magnesium hydroxide.

15. A construction element which is made of a composition of claim 1.

16. A construction element of claim 15 which is a building panel or a component thereof.

17. A roofing sheet which is made of a composition of claim 1.

18. A wire coating which is made of a composition of claim 1.

19. A fire stop which is made of a composition of claim 1.

20. A fire door of which at least one structural member is made of a composition of claim 1.

21. A pipe wrap made of a composition of claim 1.

22. A construction element made of a composition consisting essentially of about:
    7–15% of an ethylene/vinyl acetate copolymer,
    1–5% of an ethylene/methacrylic acid copolymer, which may be neutralized with a metal ion to a degree of up to about 95%,
    3–9% of polyethylene,
    2–10% of a processing oil,
    72–78% of alumina trihydrate,
    0.5–1% of glass fibers,
    0.01–2% of a surfactant, and
    0.01–2% of stearic acid,
wherein all the percentages of components are by weight.

23. A construction element of claim 22 which is a building panel or a component thereof.

24. A construction element of claim 22 wherein the average particle size of alumina trihydrate in the composition from which it is made is about 4–10 micrometers.

25. A construction element of claim 22 wherein alumina trihydrate present in the composition from which it is made is a mixture of about equal weights of alumina trihydrate having an average particle size of 3–4 micrometers with alumina trihydrate having an average particle size of about 70–100 micrometers.

26. A construction element of claim 24 which is a building panel or a component thereof.

27. A construction element of claim 25 which is a building panel or a component thereof.

* * * * *

UNITED STATES PATENT AND TRADEMARK OFFICE
CERTIFICATE OF CORRECTION

PATENT NO. : 4,851,463

DATED : July 25, 1989

INVENTOR(S) : Arthur W. Opsahl and Lewis D. Watson

It is certified that error appears in the above-identified patent and that said Letters Patent is hereby corrected as shown below:

Column 7, Claim 1, line 21, "copolymers" should be -- copolymer --.

Column 7, Claim 1, line 41, after "the" and before "consisting" insert -- group --.

Signed and Sealed this

Twenty-ninth Day of May, 1990

Attest:

HARRY F. MANBECK, JR.

*Attesting Officer*  *Commissioner of Patents and Trademarks*